Figure 7:
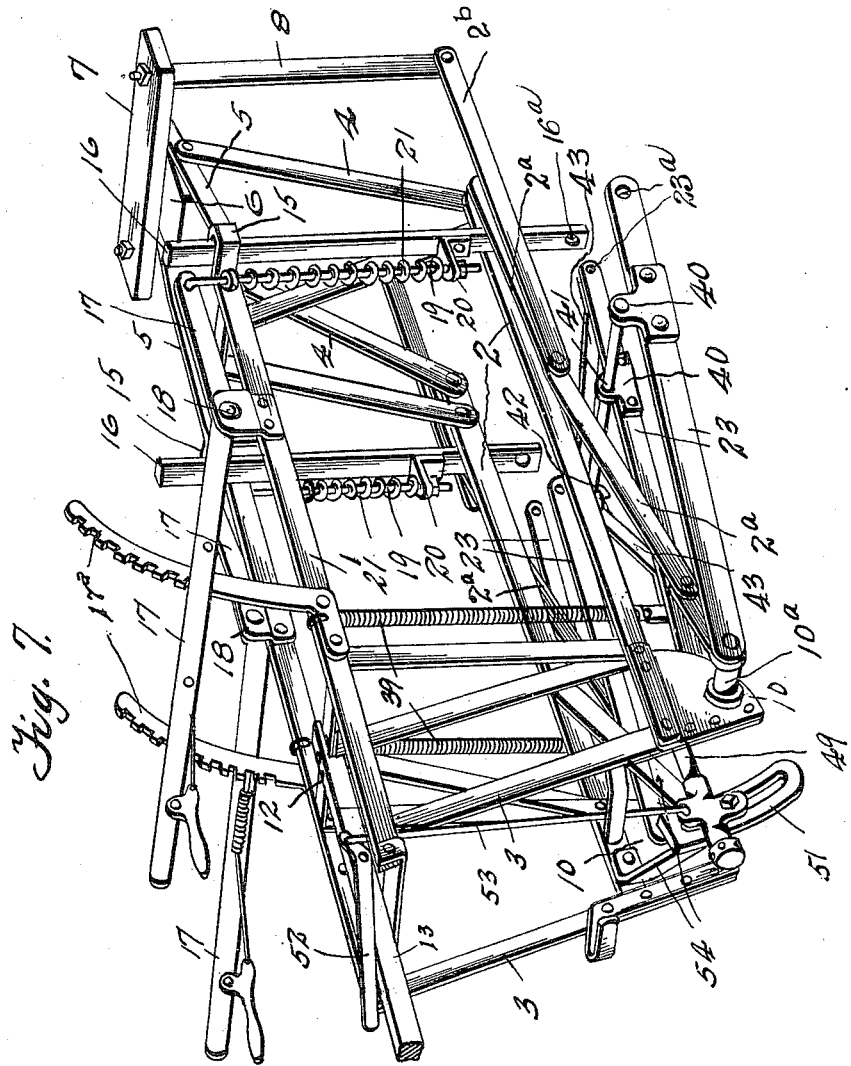

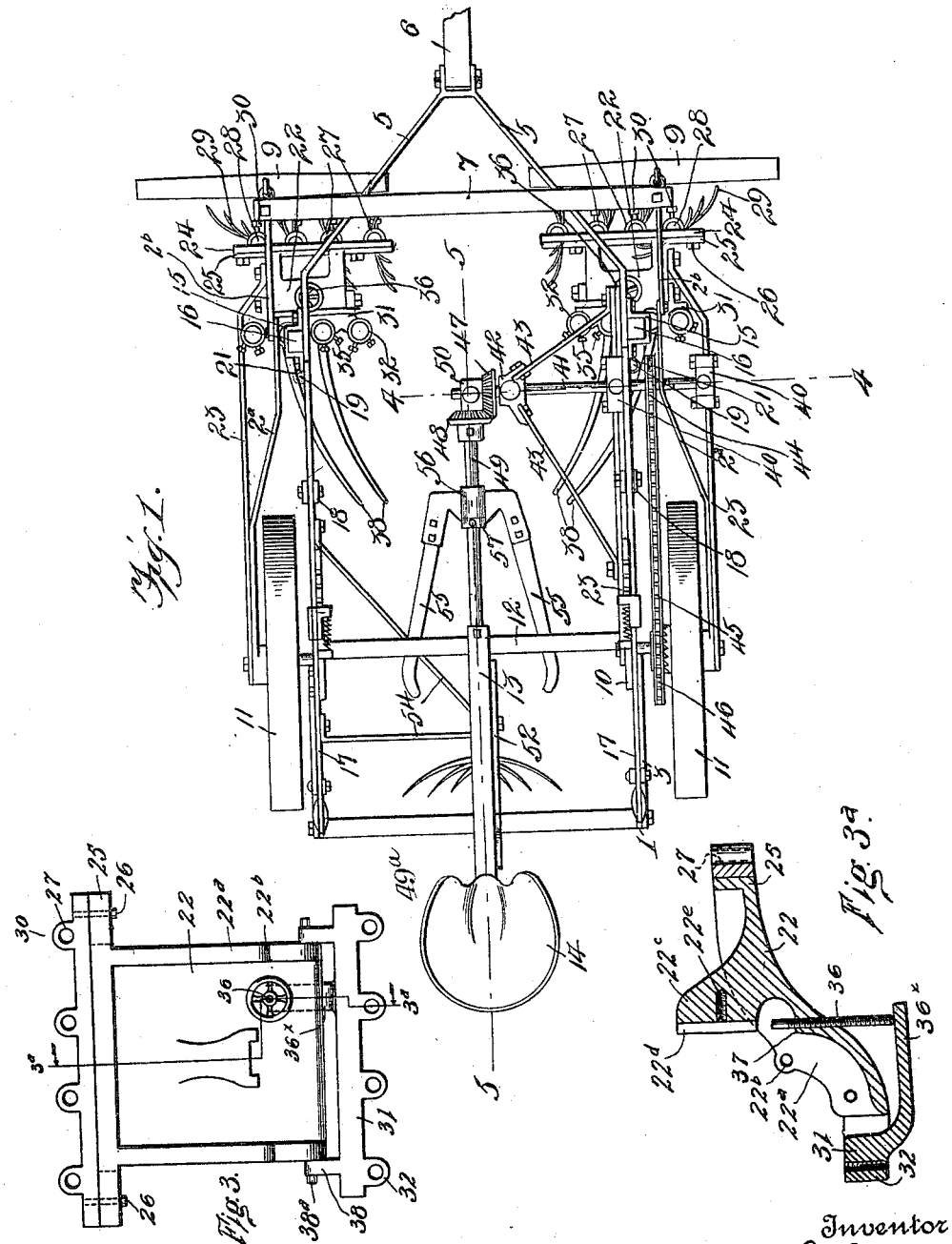

D. F. DEPPE.
CULTIVATOR.
APPLICATION FILED AUG. 31, 1907.
964,500.
Patented July 19, 1910.
4 SHEETS—SHEET 2.
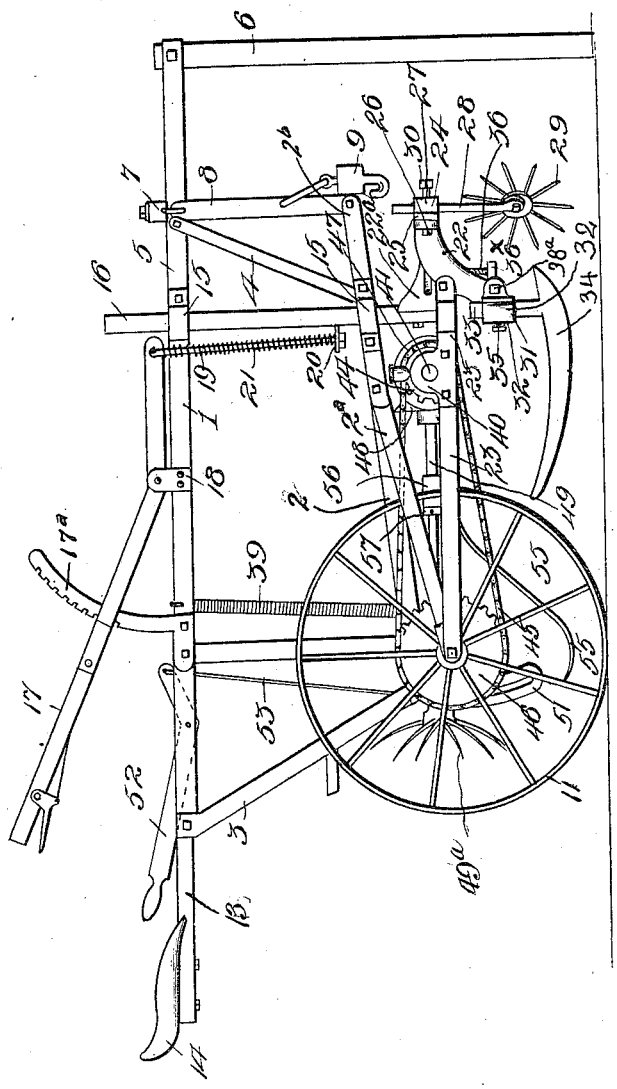
Witnesses
M. Adelaide Foster
Myron F. Clear
Inventor
Dennis F. Deppe,
by C. L. Parker
Attorney

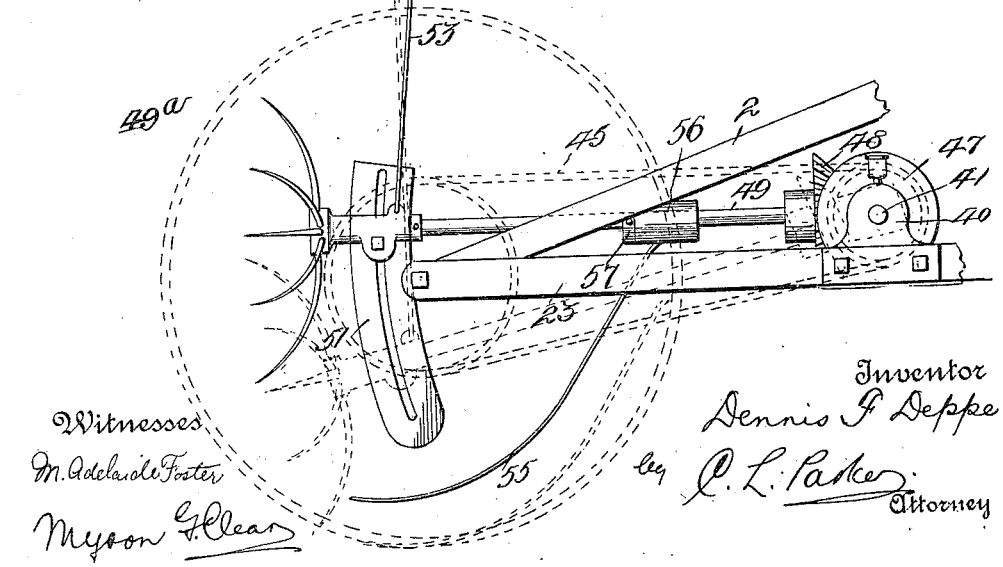

D. F. DEPPE.
CULTIVATOR.
APPLICATION FILED AUG. 31, 1907.

964,500.

Patented July 19, 1910.
4 SHEETS—SHEET 4.

WITNESSES
Chas. K. Davis
Margia E. Rueburn.

INVENTOR
Dennis F. Deppe
By R. L. Parker, Attorney

THE NORRIS PETERS CO., WASHINGTON, D. C.

UNITED STATES PATENT OFFICE.

DENNIS F. DEPPE, OF NEWBERN, NORTH CAROLINA.

CULTIVATOR.

964,500.  Specification of Letters Patent.  Patented July 19, 1910.

Application filed August 31, 1907.  Serial No. 390,896.

*To all whom it may concern:*

Be it known that I, DENNIS F. DEPPE, a citizen of the United States, residing at Newbern, in the county of Craven and State of North Carolina, have invented certain new and useful Improvements in Cultivators, of which the following is a specification.

My invention relates to a combined disk and sweep cultivator and weeder or chopper and particularly contemplates the provision of an improved construction which will be simple and inexpensive to produce and easy to handle and operate in use.

My invention specifically resides in the following features of construction, arrangement and operation, as will be hereinafter described with reference to the accompanying drawings, forming a part of this specification, in which like numerals are used to indicate like parts throughout the several figures, and in which, Figure 1 is a top plan view of my improved cultivator. Fig. 2 is a side elevation thereof. Fig. 3 is a plan view of one of the castings to which the disk and sweep frames are secured. Fig. $3^a$ is a vertical transverse sectional view taken on the line $3^a$—$3^a$ of Fig. 3. Fig. 4 is an enlarged detail sectional view on the line 4—4 of Fig. 1. Fig. 5 is a similar view taken on the line 5—5 of Fig. 1. Fig. 6 is an enlarged detail view of the weeder and chopper shaft and its component parts. Fig. 7 is a perspective view of the upper and lower frames and their connecting elements, with the wheels and cultivator parts removed.

In the practical embodiment of my invention, I provide a main stationary frame comprising an upper rectangular frame 1 and a lower frame comprising parallel side bars 2 rigidly united by uprights 3 at the rear end and by slanting supports 4 at the forward end to the upper frame 1. The upper frame 1 is provided with converging members 5 at its forward end between which is pivoted the tongue 6 in order that the same may be turned down to the position shown in Fig. 2 to support the main frame when at rest. Extending across the members 5 is a transverse beam 7 connected at its ends to the lower frame bars $2^a$ by means of the uprights 8 to which are attached swingletrees 9 on each side of the tongue 6 and by means of the connecting links $2^b$. The lower frame comprises spaced parallel side bars 2; near and spaced away from each of said side bars 2 is arranged the outer lower frame bar $2^a$, the inner or side bars 2 being connected at their rear ends to the rigid plates 10, between said rear ends of the side bars 2 and the rear ends of the frame bars $2^a$ are rotatably journaled the short axles $10^a$, carrying thereon the cultivator wheels 11 projecting between the bars 2 and $2^a$. The bar 2 is connected to the upper part of plate 10 at its rear end and lies inside the wheel 11; its forward end extends forward of the bar 16 and is connected to the forward end of bar $2^a$, which extends rearwardly and is bent downward and outward and surrounds the axle 10 outside of the wheel 11. The link $2^b$ is connected to bar $2^a$ medially.

The upper frame 1 is provided with a transverse supporting bar 12 having a seat bar 13 extending rearwardly therefrom and provided with the operator's seat 14 at its rear end.

The upper frame 1 is formed with vertically alined guides 15 adjacent its forward end through which work the vertical guide bars 16 connected at their lower ends to the disk and sweep frames. The guide bars 16 at their lower ends lie between bars 2 and $2^a$. The disk and sweep frames are connected to the lower ends of the guide bars 16 at each side of the cultivator and are adjustable toward and from the surface of the soil on each side of the row of crops, by operating bars 17 in the form of bell-crank levers pivotally mounted in clips 18 on the upper frame 1 and attached to the guide bars 16 by connecting rods 19 extending from their forward ends and downwardly and loosely through brackets 20, fixed to the guide bars 16. The connecting rods 19 are provided with nuts below the said brackets 20 by which said guide bars may be raised, and are further provided with encircling coil springs 21 secured at their upper ends and bearing downwardly upon the brackets 20, whereby the disk and sweep frames may be resiliently supported and may spring upwardly upon contact with a large stone or other obstacle, without breaking.

Each of the disk and sweep frames comprises a main body casting 22 having rearwardly and downwardly bent spaced sides 22ª, provided near the rear ends thereof with the alined apertured ears 22ᵇ. The body casting 22 is provided centrally thereof with the upwardly and rearwardly extending tongue 22ᶜ which is made or cast integral with the body casting 22. The tongue 22ᶜ is provided with the vertical groove 22ᵈ adapted to receive the lower end of the guide bar 16. The lower end of said guide bar 16 is apertured as at 16ª, and said aperture 16ª is adapted to register with an internally screw-threaded opening 22ᵉ upon the tongue 22ᶜ, whereby said guide bar 16 may be secured to said tongue 22ᶜ by means of a suitable bolt. The pivotal connecting bars 23 are pivotally connected to the apertured ears 22ᵇ of the body casting 22 and extend rearwardly for pivotal engagement with the axle 10ª. The disk frames 24 are secured forwardly of the castings 22 and to transversely extending pieces 25 thereof, and said frames 24 may be adjusted laterally by means of their clamping bolts 26, which pass rearwardly through longitudinal slotted openings in said transverse pieces 25. The disk frames are provided with a plurality of sockets 27 through which the disk bars 28, carrying skeleton disks 29, are adjustably secured by screw bolts 30. The sweep frames 31 are similarly provided with sockets 32 through which the sweep bars 33 carrying sweeps 34 are adjustably secured by means of screw bolts 35. The sweep frames 31 are swingingly secured at the rear of castings 22, by bolts 38ª, passing through forwardly projecting ears 38 of said sweep frame 31, and through the rear ends of said sides 22ª. Said sweep frame 31 is provided upon the lower forward edge thereof and near the outer side thereof, with the angular forwardly extending finger 36ˣ. An adjusting screw 36 passing through a lug 37 upon the upper surface of the body casting 22, engages the forward end of said finger 36ˣ, and forms an adjusting means whereby said frame 31 may be swung upon its pivotal points, toward or away from the ground. The operating bars 17 for each disk and sweep frame are independently operable and work with releasable latches upon notched quadrants 17ª, bolted upon the upper frame 1. The disk and sweep frames are further resiliently supported by coil springs 39 extending between the upper frame 1 and the pivotal connecting bars 23 and tensioned to draw said bars upwardly when the operating bars 17 are released.

Mounted transverse through bearings 40 formed in the pivotal connecting bars 23 of one of the disk and sweep frames, and below and forwardly of the lower frame 2, is a shaft 41 extending to approximately the longitudinal center of the cultivator and supported at its inner ends in a bearing 42 formed at the ends of the diagonal braces 43 attached to the inner one of said bars 23. The shaft 41 is provided thereon between the bars 23 with a sprocket wheel 44 connected by means of a sprocket chain 45 to a sprocket wheel 46, mounted on the wheel shaft on the same side of the machine, by which means said shaft 41 is rotated. The shaft 41 is provided on its inner end with a bevel gear 47 with which meshes a bevel gear 48 mounted on a rotatable shaft 49. The shaft 49 extends centrally and longitudinally of the cultivator frame, and transversely and rearwardly of the shaft 41, and pivotally secured at its forward end to rotate, within a block 50 loosely mounted upon the end of the shaft 41. The shaft 49 is thus rotated from the shaft 41 and is free at its rear end to move vertically in a guide plate 51, by means of an adjusting bell-crank-lever 52 pivotally mounted on the seat bar 13, and connected to said shaft 49 by a connecting rod 53. The shaft 49 is designed to have rigidly secured upon its rear end, a weeding wheel 49ª, shown in Fig. 6, or a cotton chopping wheel, to rotate thereon above the line of crops, and to be lowered to perform its operation, when desired, by the means just described. The guide plate 51 is supported by means of the diagonal braces 54 extending from one of the frame bars 2. Depending from the shaft 49 are spring arms 55, extending from a sleeve 56 loosely mounted on said shaft forwardly of a rigid collar 57 and adapted to slide along the ground when the shaft 49 is lowered to the operative position in order that said shaft may move to and from the surface of the soil and conform to the irregularities thereof.

From the foregoing description, it will be seen that I provide numerous novel and simple features combining to provide a cultivator of an improved construction and operation.

Having thus described my invention, what I claim is:

1. In a cultivator the combination of a wheeled frame having guides at its forward end, combined disk and sweep frames mounted within said frame forwardly of said guides, and having guide bars projecting through said guides, and means for adjusting said disk and sweep frames.

2. A cultivator of the character described, comprising a wheeled frame, a rod movably mounted upon said frame, a member secured upon said rod, a disk support arranged upon said member adapted to be adjustable transversely thereof, a sweep support swingingly mounted upon said member, means for adjusting said sweep support including an adjusting screw arranged upon said member and in engagement with a portion of said sweep support, and means for adjusting said rod, substantially as described.

3. A cultivator of the character described, comprising a wheeled frame, a member arranged upon said frame for supporting disk and sweep supports, means for adjusting said member vertically, means for adjusting said disk support transversely of said member, said sweep support being mounted upon said member to swing in a substantially vertical plane, and means for adjusting said sweep support, and holding the same in such adjusted position, substantially as described.

In testimony whereof I affix my signature in presence of two witnesses.

DENNIS F. DEPPE.

Witnesses:
S. L. DILL,
S. R. STREET, Jr.